(12) United States Patent
Zhang et al.

(10) Patent No.: US 12,438,216 B1
(45) Date of Patent: Oct. 7, 2025

(54) BATTERY PACK, HEAT EXCHANGE SYSTEM FOR BATTERY PACK, AND HEAT EXCHANGE SYSTEM FOR BATTERY CLUSTER

(71) Applicant: CHINA AUTOMOTIVE NEW ENERGY (TIANJIN) TECHNOLOGY CO., LTD., Tianjin (CN)

(72) Inventors: Yinfeng Zhang, Tianjin (CN); Ting Chen, Tianjin (CN); Xinpeng Li, Tianjin (CN)

(73) Assignee: CHINA AUTOMOTIVE NEW ENERGY (TIANJIN) TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 19/192,852

(22) Filed: Apr. 29, 2025

(30) Foreign Application Priority Data

May 23, 2024 (CN) .......................... 202410644641.4

(51) Int. Cl.
| | | |
|---|---|---|
| *H01M 10/6568* | (2014.01) | |
| *H01M 10/613* | (2014.01) | |
| *H01M 10/647* | (2014.01) | |
| *H01M 50/209* | (2021.01) | |
| *H01M 50/342* | (2021.01) | |
| *H01M 50/51* | (2021.01) | |

(52) U.S. Cl.
CPC ..... *H01M 10/6568* (2015.04); *H01M 10/613* (2015.04); *H01M 10/647* (2015.04); *H01M 50/209* (2021.01); *H01M 50/3425* (2021.01); *H01M 50/51* (2021.01)

(58) Field of Classification Search
CPC ........... H01M 10/6568; H01M 10/613; H01M 10/647; H01M 50/209; H01M 50/3425; H01M 50/51
See application file for complete search history.

(56) References Cited

FOREIGN PATENT DOCUMENTS

| | | |
|---|---|---|
| CN | 201181716 Y | 1/2009 |
| CN | 107732084 A | 2/2018 |
| CN | 209104230 U | 7/2019 |
| CN | 210607540 U * | 5/2020 |
| CN | 114335806 A | 4/2022 |

(Continued)

OTHER PUBLICATIONS

CN210607540 Machine translation (Year: 2025).*

(Continued)

*Primary Examiner* — Lingwen R Zeng
(74) *Attorney, Agent, or Firm* — Westbridge IP LLC (57) ABSTRACT

A battery pack includes: a box body which is provided with a liquid inlet port and a liquid outlet port; a top cover which is located at the top of the box body; and a plurality of battery modules which are located in the box body, where the battery module includes a plurality of stacked battery cells, a top plate is arranged at the tops of the plurality of battery cells, end plates are arranged at two opposite sides in a lengthwise direction, flow channel plates are arranged at two opposite sides in a widthwise direction, a heat exchange structure is arranged below, and a sealed space is formed; a plurality of first flow channel grooves are formed in one side close to the battery cells.

8 Claims, 9 Drawing Sheets

(56) References Cited

FOREIGN PATENT DOCUMENTS

| | | |
|---|---|---|
| CN | 218101444 U | 12/2022 |
| CN | 219350407 U | 7/2023 |
| CN | 116565372 A | 8/2023 |
| CN | 116864861 A | 10/2023 |
| CN | 220021294 U | 11/2023 |
| CN | 117543154 A | 2/2024 |
| WO | 2019034097 A1 | 2/2019 |

OTHER PUBLICATIONS

First Office Action issued in counterpart Chinese Patent Application No. 202410644641.4, dated Jul. 16, 2024.
Notification to Grant Patent Right for Invention issued in counterpart Chinese Patent Application No. 202410644641.4, dated Aug. 30, 2024.

* cited by examiner

BATTERY PACK, HEAT EXCHANGE SYSTEM FOR BATTERY PACK, AND HEAT EXCHANGE SYSTEM FOR BATTERY CLUSTER

TECHNICAL FIELD

Cross-Reference to Related Applications

This application claims priority to Chinese Patent Application No. 202410644641.4, filed on May 23, 2024, the content of which is incorporated herein by reference in its entirety.

Technical Field

The present application relates to the technical field of batteries, and especially relates to a battery pack, a heat exchange system for the battery pack, and a heat exchange system for a battery cluster.

BACKGROUND

With continuous development of science and technology, a demand for energy is gradually increasing, and use frequency for power batteries and energy storage batteries is gradually increasing; and in a use process for the batteries, a large amount of heat is generated, and the batteries need to be cooled and subjected to heat dissipation, so that normal and stable running of devices is ensured. An immersed heat exchange technology involves immersing battery modules into an insulation heat exchange medium, and removing heat through circulation flow of the heat exchange medium, and has the effects of high heat dissipation and high safety. However, battery modules in an existing battery pack are usually provided with side plates to improve stability, and when the battery modules are immersed into a heat exchange medium, the side plates block the heat exchange medium from exchanging heat to side surfaces of the battery modules to reduce a heat exchange effect, therefore, there is an urgent need for a battery pack with high structure stability and a good heat exchange effect.

SUMMARY

In view of this, the objective of the present application is to propose a battery pack, a heat exchange system for the battery pack, and a heat exchange system for a battery cluster, for solving the above technical problems.

In a first aspect of the present application, a battery pack is provided, and includes: a box body which is provided with a liquid inlet port and a liquid outlet port; a top cover which is located at the top of the box body; and a plurality of battery modules which are located in the box body, where the battery module includes a plurality of stacked battery cells, a top plate is arranged at the tops of the plurality of battery cells, end plates are arranged at two opposite sides in a lengthwise direction, flow channel plates are arranged at two opposite sides in a widthwise direction, a heat exchange structure is arranged below, and the plurality of battery cells are coated with the top plate, the end plates, the flow channel plates and the heat exchange structure to form a sealed space, so as to accommodate a heat exchange medium; a plurality of first flow channel grooves facing the lengthwise direction are formed in one side close to the battery cells, of the flow channel plate, one end of the first flow channel groove communicates with the liquid inlet port, the other end of the first flow channel groove communicates with the liquid outlet port, and groove openings of the first flow channel grooves are abutted against side walls of the battery cells to form flow channels; and the heat exchange structure communicates with the liquid inlet port, the bottom of the sealed space communicates with the heat exchange structure, and the top of the sealed space communicates with the liquid outlet port.

In a second aspect of the present application, a heat exchange system for the battery pack is provided, and includes a heat exchanger, an expansion pot, a drive pump, and the battery pack described in the first aspect above, which form a series circuit.

In a third aspect of the present application, a heat exchange system for a battery cluster is provided, and includes a heat exchanger, an expansion pot, a drive pump, and a battery cluster which form a series circuit, where the battery cluster includes a plurality of the battery packs described in the first aspect above and connected in series.

It may be seen from the above that, the present application provides a battery pack, a heat exchange system for the battery pack, and a heat exchange system for a battery cluster, where the battery pack includes: a box body which is provided with a liquid inlet port and a liquid outlet port, and the liquid inlet port and the liquid outlet port are used for entering and flowing-out of a heat exchange medium; a top cover which is located at the top of the box body; and a plurality of battery modules which are located in the box body, where the battery module includes a plurality of stacked battery cells, a top plate is arranged at the tops of the plurality of battery cells, end plates are arranged at two opposite sides in a lengthwise direction, flow channel plates are arranged at two opposite sides in a widthwise direction, a heat exchange structure is arranged below, and the plurality of battery cells are coated with the top plate, the end plates, the flow channel plates and the heat exchange structure to form a sealed space, so as to accommodate the heat exchange medium; the heat exchange structure communicates with the liquid inlet port, the bottom of the sealed space communicates with the heat exchange structure, and the top of the sealed space communicates with the liquid outlet port, in this way, the heat exchange medium enters into the sealed space from the heat exchange structure, and then leaves from the top, so that immersed heat exchange for the battery cells is realized, and temperatures of the bottoms, the tops and large surfaces of the battery cells may be reduced during cooling; a plurality of first flow channel grooves facing the lengthwise direction are formed in one side close to the battery cells, of the flow channel plate, one end of the first flow channel groove communicates with the liquid inlet port, the other end of the first flow channel groove communicates with the liquid outlet port, and groove openings of the first flow channel grooves are abutted against side walls of the battery cells to form flow channels, in this way, the heat exchange medium enters into the first flow channel grooves from one ends of the battery modules, and then leaves from the other ends, and may be in direct contact with the battery cells for heat exchange, temperatures of side surfaces of the battery cells may be greatly reduced during cooling, and moreover, due to a limitation of the flow channel plates, safety performance such as vibration resistance and impact resistance, of the battery modules is improved, and structure stability of the battery modules is improved, and heat exchange for six surfaces of the battery cells is overall realized in cooperation with a flow direction of the above heat exchange medium, so that a good heat exchange effect is achieved; a temperature of a battery system under a condition of fast charging may be effectively controlled, so that the system achieves effects of high-efficiency heat exchange and excellent temperature equalization; traditional heat exchange components are reduced, so that energy density and a volume utilization rate of the system are increased, and meanwhile, a use cost is reduced; oxygen is thoroughly isolated in a fully-immersed heat exchange manner, so that heat safety performance of the whole system is improved; meanwhile, a consideration is given to both the vehicle-mounted field and the field of energy storage, so that high extendibility is achieved; and the battery pack, the heat exchange system for the battery pack, and the heat exchange system for the battery cluster are simple in structure, convenient to produce, good in heat exchange effect, high in safety performance, and long in service life.

BRIEF DESCRIPTION OF THE DRAWINGS

In order to describe the technical solutions in the present application or the related art more clearly, a brief introduction for the drawings required in the description for the examples or the related art will be provided below, apparently, the drawings in the description below show merely the examples of the present application, and those of ordinary skill in the art may also derive other drawings from these drawings without making creative efforts.

DETAILED DESCRIPTION OF THE EMBODIMENTS

In order to make the objectives, technical solutions and advantages of the present application clearer, the present application will be further described in detail below in combination with specific examples and with reference to the drawings.

It should be noted that, unless otherwise defined, technical terms or scientific terms used in the examples of the present application should have the ordinary meanings as understood by those having ordinary skill in the art to which the present application belongs. The "first", "second", and similar words used in the examples of the present application do not indicate any order, quantity, or importance, but are merely used for distinguishing different components. The "including" or "containing", and similar words refer to elements or objects that appear before the word, including those listed after the word and equivalents thereof, without excluding other elements or objects. The "connection" or "connected", and similar words are not limited to physical connections or mechanical connections, but may include electrical connections, whether direct or indirect. The "upper", "lower", "left", "right", etc. are merely used for indicating relative position relationships, and when an absolute position of a described object is changed, the relative position relationship may also be correspondingly changed.

With continuous development of science and technology, a demand for energy is gradually increasing, and use frequency for power batteries and energy storage batteries is gradually increasing; and in a use process for the batteries, a large amount of heat is generated, and the batteries need to be cooled and subjected to heat dissipation, so that normal and stable running of devices is ensured.

At present, heat management manners for the industries of new-energy electric vehicles and energy storage mainly include air-cooling systems and liquid-cooling systems. With regard to demands for fast charging and safety, of client sides, commonly-used air cooling manner and liquid-cooling manner cannot meet temperature requirements of battery cells, and if a heat exchange effect of a conventional heat management manner needs to be improved, a cost is greatly increased, heat exchange performance cannot be absolutely guaranteed, and heat safety performance also needs to be verified.

An immersed heat exchange technology is a heat exchange technology of immersing a heating device into an insulation heat exchange medium, and directly taking away heat through circulation flow or boiling phase change of a heat exchange medium. The technology is introduced with emergence of high-heat-dissipation and high-safety scenes such as data centers, and replaces air cooling and traditional liquid cooling that cannot meet a demand of heat dissipation in the high-heat-dissipation scenes. At present, development of immersed heat exchange in the field of data centers has entered a comprehensive application period and has radiated to other industries, with a large number of mature products used on the client sides. With increasing demands for fast charging and safety, of the client sides, major manufacturers have successively launched high-rate charging and discharging products, so that higher requirements have been placed on both heat dissipation and safety of battery systems in this situation. Due to the fact that application scenes in new energy battery systems are very similar to those in the data centers, the immersed heat exchange technology has begun to receive significant attention from the industry of new energy and has been extensively researched and used, becomes one of development directions for future heat management systems for batteries, and may effectively control temperatures of the battery systems under a condition of fast charging. According to performance parameters of high-insulation heat exchange medium and in combination with structure designs for the battery systems, effects of high-efficiency heat exchange and excellent temperature equalization are achieved, and meanwhile, energy density of the systems is increased, heat safety performance of the systems is improved, and effects of high-rate charging and discharging, and no ignition or diffusion in heat runaway are realized.

At present, an immersed heat exchange technology in the field of batteries involves immersing battery modules into an insulation heat exchange medium, and taking away heat through circulation flow of the heat exchange medium, and has effects of high heat dissipation and high safety. However, battery modules in an existing battery pack are usually provided with side plates to improve stability, and when the battery modules are immersed into a heat exchange medium, the side plates block the heat exchange medium from exchanging heat to side surfaces of the battery modules; and in some technologies, Cell-to-Pack (CTP, non-module power battery pack) batteries are directly immersed into a heat exchange medium to facilitate heat exchange for side surfaces of battery modules, however, structure stability of the battery modules is greatly reduced. Therefore, there is an urgent need for a battery pack with high structure stability and a good heat exchange effect.

In a process of realizing the present application, it is found that side plates may be considered to be arranged as flow channel plates, so that a heat exchange medium flows along flow channels of the flow channel plates and takes away heat from side surfaces of battery modules, so that a heat exchange effect can be improved while structure stability of the battery modules is guaranteed; and further, if the flow channel plates are just conventional flow channel plates with completely-closed flow channels, and the flow channels are arranged in a manner of being abutted against side walls of the battery modules, then the heat exchange medium and the battery modules are in a form of wall-type heat exchange, the flow channel plates may be considered to be improved, semi-closed flow channel grooves are formed in the flow channel plates, and complete flow channels are formed through cooperation between the flow channel grooves and the side walls of the battery modules, then the heat exchange medium and the battery modules are in a form of direct-contact heat exchange, so that the heat exchange effect is greatly improved, and meanwhile, the structure stability is also considered.

The technical solution of the present application will be described below in detail through specific examples and in combination with FIG. 1 to FIG. 19.

Figure 1:
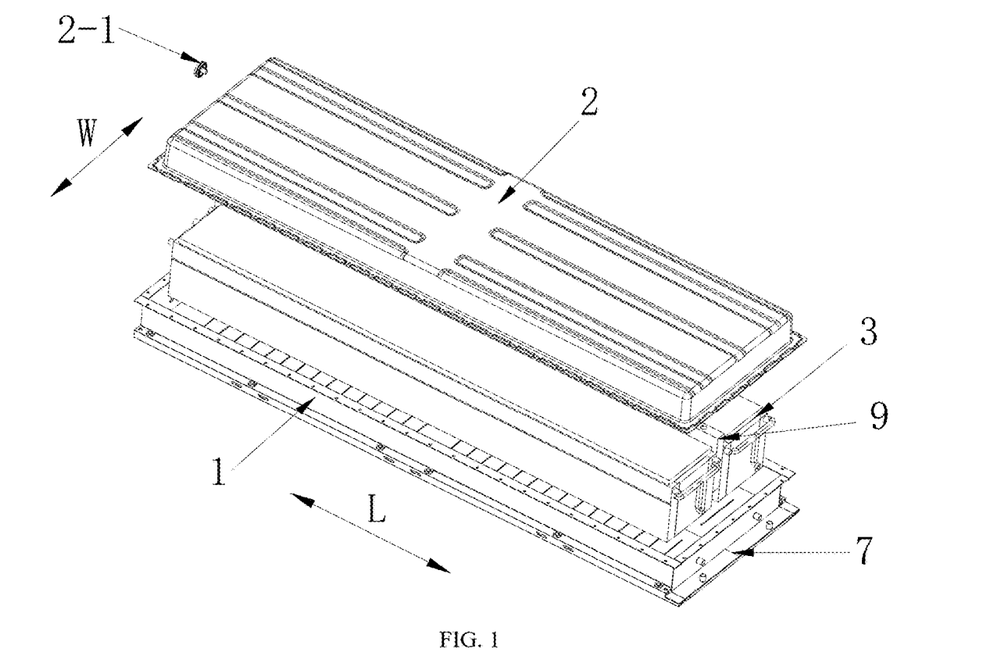
FIG. 1 is a schematic diagram of an explosive structure of a first battery pack in the example of the present application.

Some examples of the present application provide a battery pack, and as shown in FIG. 1, the battery pack includes: a box body 1 which is provided with a liquid inlet port 1-1 and a liquid outlet port 1-2; a top cover 2 which is located at the top of the box body 1; and a plurality of battery modules 3 which are located in the box body 1, where the battery module 3 includes a plurality of stacked battery cells 3-1, a top plate 4 is arranged at the tops of the plurality of battery cells 3-1, end plates 5 are arranged at two opposite sides in a lengthwise direction, flow channel plates 6 are arranged at two opposite sides in a widthwise direction, a heat exchange structure 7 is arranged below, and the plurality of battery cells 3-1 are coated with the top plate 4, the end plates 5, the flow channel plates 6 and the heat exchange structure 7 to form a sealed space 8, so as to accommodate a heat exchange medium; a plurality of first flow channel grooves 6-1 facing the lengthwise direction are formed in one side close to the battery cells 3-1, of the flow channel plate 6, one end of the first flow channel groove 6-1 communicates with the liquid inlet port 1-1, the other end of the first flow channel groove 6-1 communicates with the liquid outlet port 1-2, and groove openings 6-1a of the first flow channel grooves 6-1 are abutted against side walls of the battery cells 3-1 to form flow channels 15; and the heat exchange structure 7 communicates with the liquid inlet port 1-1, the bottom of the sealed space 8 communicates with the heat exchange structure 7, and the top of the sealed space 8 communicates with the liquid outlet port 1-2.

Figure 3:
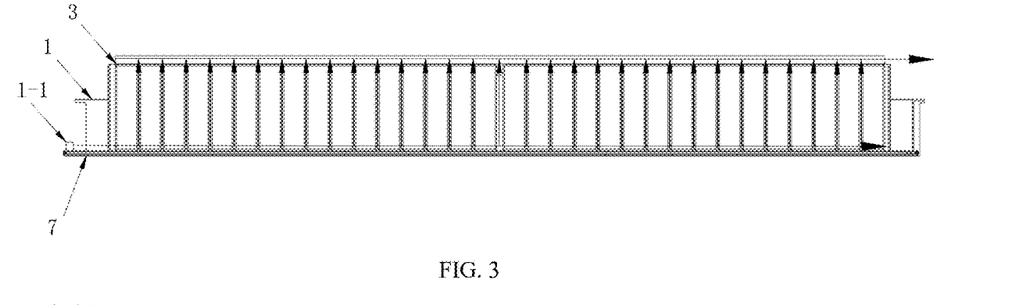
FIG. 3 is a schematic diagram of a flow direction of a heat exchange medium in the battery pack in FIG. 1.
Figure 8:
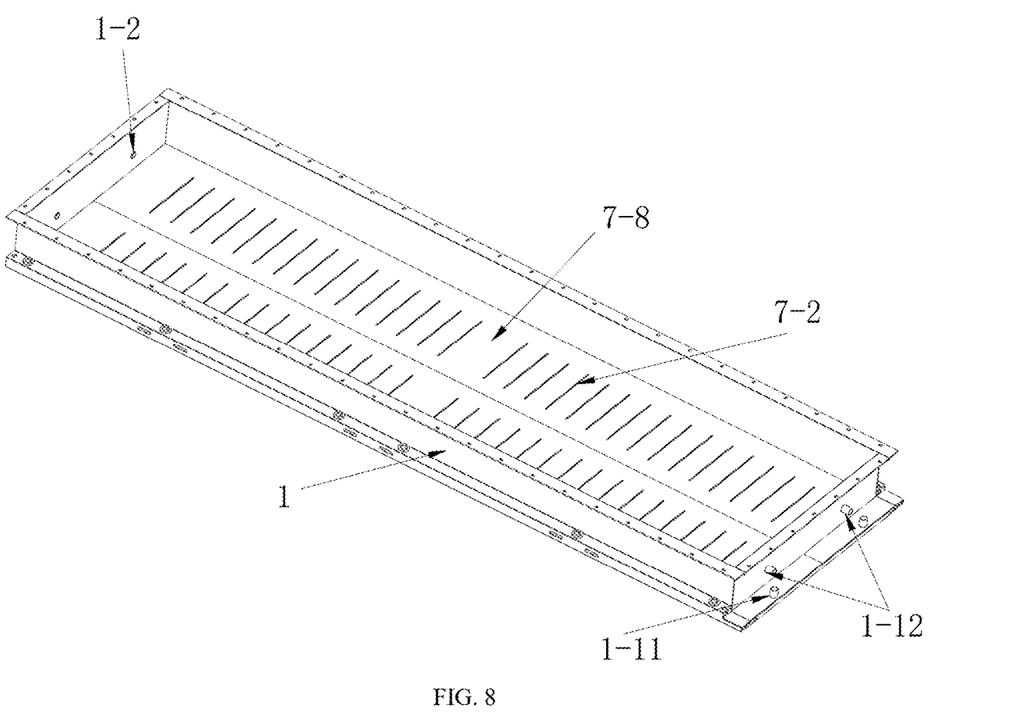
FIG. 8 is a schematic structure diagram of a first heat exchange structure in the example of the present application.

As shown in FIG. 1, an L direction is a lengthwise direction, a W direction is a widthwise direction, a battery pack includes a box body 1, as shown in FIG. 3, one end of the box body 1 is provided with a liquid inlet port 1-1, as shown in FIG. 8, the other end of the box body 1 is provided with a liquid outlet port 1-2, the liquid inlet port 1-1 and the liquid outlet port 1-2 are used for entering and flowing-out of a heat exchange medium into and from the battery pack 10, a heat exchange medium circulation system may be connected, and the heat exchange medium is, for example, insulation cooling oil, which is not specifically limited.

Figure 2:
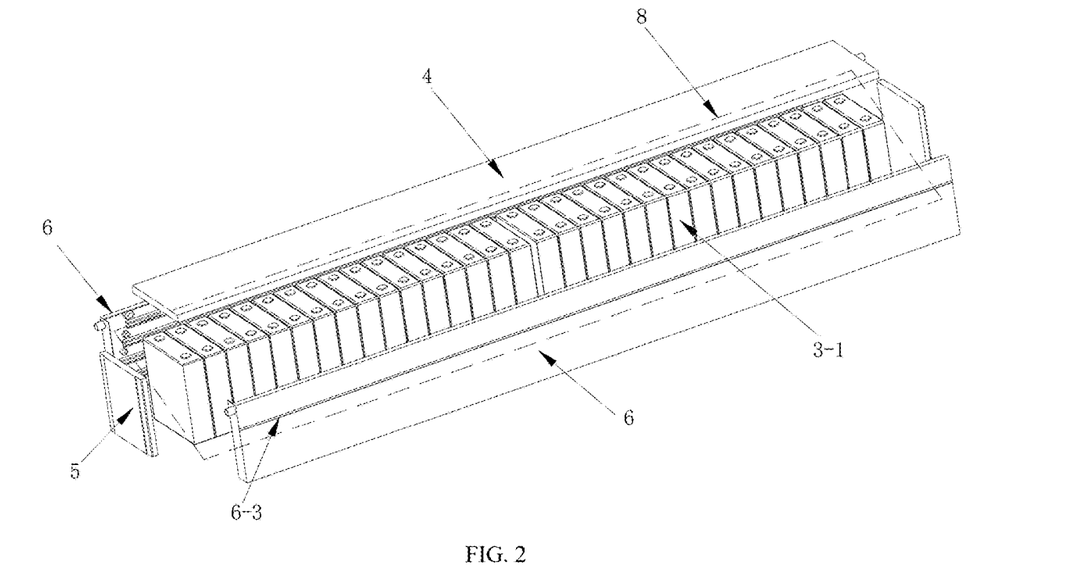
FIG. 2 is a schematic diagram of an explosive structure of a first battery module in the example of the present application.

A plurality of battery modules 3 are arranged in the box body 1, as shown in FIG. 2, the battery module 3 includes a plurality of stacked battery cells 3-1, such as square-shell battery cells, and the adjacent battery cells 3-1 are arranged with a gap; a top plate 4 is arranged at the tops of the plurality of battery cells 3-1, end plates 5 are arranged at two opposite sides in the lengthwise direction, flow channel plates 6 are arranged at two opposite sides in the widthwise direction, a heat exchange structure 7 is arranged below, and the plurality of battery cells 3-1 are coated with the top plate 4, the end plates 5, the flow channel plates 6 and the heat exchange structure 7 to form a sealed space 8, so as to accommodate the heat exchange medium.

The heat exchange structure 7 communicates with the liquid inlet port 1-1, the bottom of the sealed space 8 communicates with the heat exchange structure 7, and the top of the sealed space 8 communicates with the liquid outlet port 1-2, as shown in FIG. 3, in this way, the heat exchange medium enters into the sealed space 8 from the heat exchange structure 7, passes through the gaps of the battery cells 3-1, and then leaves from the tops of the battery cells 3-1, so that immersed heat exchange for the battery cells 3-1 is realized, and temperatures of the bottoms, the tops and large surfaces of the battery cells 3-1 may be reduced during cooling.

Figure 4:
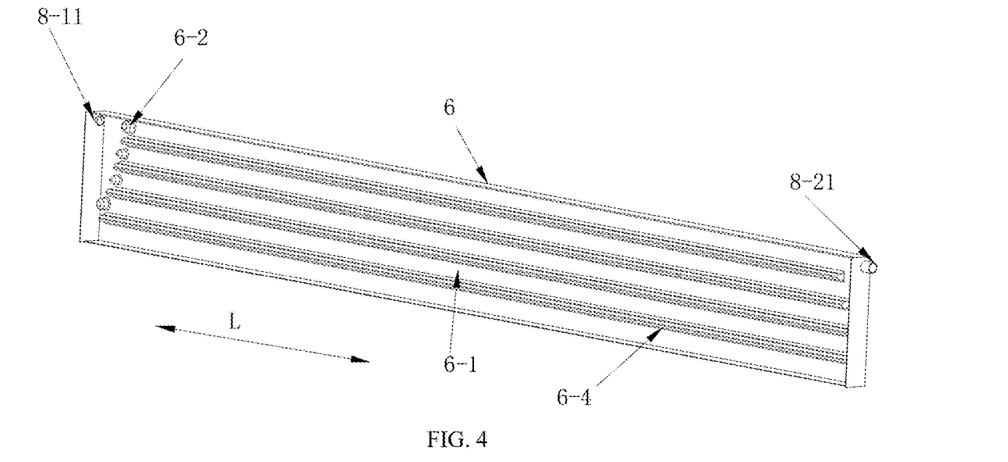
FIG. 4 is a schematic diagram of an internal structure of a flow channel plate in the example of the present application.
Figure 6:
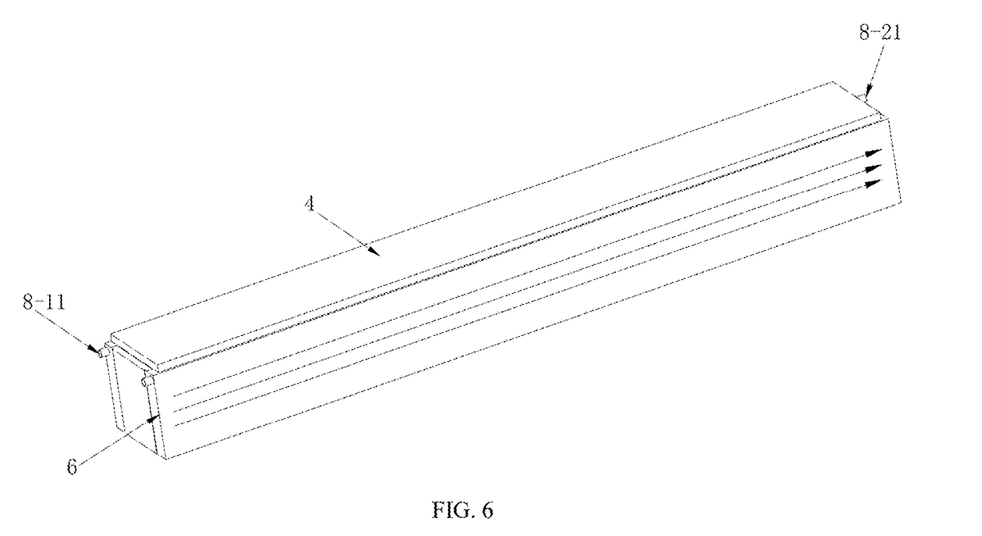
FIG. 6 is a schematic diagram of a flow direction of a heat exchange medium in the flow channel plate in FIG. 4.

As shown in FIG. 4, four first flow channel grooves 6-1 facing the lengthwise direction are formed in one side close to the battery cells 3-1, of the flow channel plate 6, each first flow channel groove 6-1 is formed in the lengthwise direction, one end of the first flow channel groove 6-1 communicates with the liquid inlet port 1-1, and the other end of the first flow channel groove 6-1 communicates with the liquid outlet port 1-2. As show in FIG. 15, groove openings 6-1a of the first flow channel grooves 6-1 are abutted against, that is, are in close contact with side walls of the battery cells 3-1 to form flow channels 15, as shown in FIG. 6, in this way, the heat exchange medium enters into the first flow channel grooves 6-1 from one ends of the battery modules 3, and then leaves from the other ends, and may be in direct contact with the battery cells 3-1 for heat exchange, temperatures of side surfaces of the battery cells 3-1 may be greatly reduced during cooling, and moreover, due to a limitation of the flow channel plates 6, safety performance such as vibration resistance and impact resistance, of the battery modules 3 is improved, and structure stability of the battery modules 3 is improved, and heat exchange for six surfaces of the battery cells 3-1 is overall realized in cooperation with a flow direction of the above heat exchange medium, so that a good heat exchange effect is achieved; in addition, the formed flow channels 15 may be completely closed, for example, when the plurality of battery cells 3-1 are arranged without gaps, the side walls of the battery cells 3-1 and the groove openings 6-1*a* of the first flow channel grooves 6-1 may be cooperated to form flow channels 15 which are closed in the lengthwise direction, and the heat exchange medium may flow completely along the flow channels 15; the formed flow channels 15 may also be partially closed, for example, when the plurality of battery cells 3-1 are arranged with gaps, the side walls of battery cells 3-1 and the groove openings 6-1*a* of the first flow channel grooves 6-1 may be cooperated to form flow channels 15 which are partially closed in the lengthwise direction, structure adhesives or buffer pads, etc. may be arranged among the battery cells 3-1, most of the heat exchange medium may flow along the flow channels 15, while a small portion of the heat exchange medium flows towards the gaps of the battery cells 3-1, merges with the heat exchange medium flowing through the heat exchange structure 7, and leaves from the top of sealed space 8.

A test is carried out under conditions of a normal-temperature environment and 2C-rate charging and discharging, during cooling for the battery pack 10 of the present application, compared with a traditional battery pack subjected to indirect heat exchange, the maximum temperature of the modules is reduced by 15° C. (the maximum temperature of the battery pack of the present application is 37° C., and the maximum temperature of the traditional battery pack is 52° C.), and a temperature difference is reduced by 8° C. (the temperature difference of the battery pack of the present application is 6° C., and the temperature difference of the traditional battery pack is 14° C.); according to the battery pack, a temperature of a battery system under a condition of fast charging may be effectively controlled, so that the system achieves effects of high-efficiency heat exchange and excellent temperature equalization; traditional heat exchange components are reduced, so that energy density and a volume utilization rate of the system are increased, and meanwhile, a use cost is reduced; oxygen is thoroughly isolated in a fully-immersed heat exchange manner, so that heat safety performance of the whole system is improved; and meanwhile, a consideration is given to both the vehicle-mounted field and the field of energy storage, so that high extendibility is achieved.

A production method for the battery pack includes, for example, alternately stacking battery cells 3-1 with fillers, then bonding end plates 5 to large surfaces of the battery cells 3-1 at both ends, arranging flow channel plates 6 at both sides of the plurality of battery cells 3-1, fixing the flow channel plates 6 and the end plates 5 through laser welding, then bonding a top plate 4, placing battery modules 3 in a box body 1, fixing the battery modules 3 through bolts, and covering with a top cover 2, so as to complete assembling for the battery pack.

The battery pack is simple in structure, convenient to produce, and good in heat exchange effect, realizes rapid and effective ultimate heat exchange for the interior of the battery system, and is high in safety performance, and long in service life.

In some examples, as shown in FIG. 4, first flow channel grooves 6-1 may be formed through arranging reinforcing ribs 6-4 on the flow channel plates 6, a material of the flow channel plates 6 is, for example, aluminum alloy, the reinforcing ribs 6-4 may be formed through stamping, a width of the reinforcing rib 6-4 is, for example, 10 mm to 12 mm, and a height of the reinforcing rib 6-4 is, for example, 10 mm to 12 mm, which are not specifically limited.

In some examples, the top of one side of the flow channel plate 6 communicates with the liquid inlet port 1-1, the top of the other side of the flow channel plate 6 communicates with the liquid outlet port 1-2, and turbulent-flow blocks 6-2 are arranged on the flow channel plates 6, located at end parts of the first flow channel grooves 6-1, and arranged in a manner of being close to the liquid inlet port 1-1.

Figure 5:
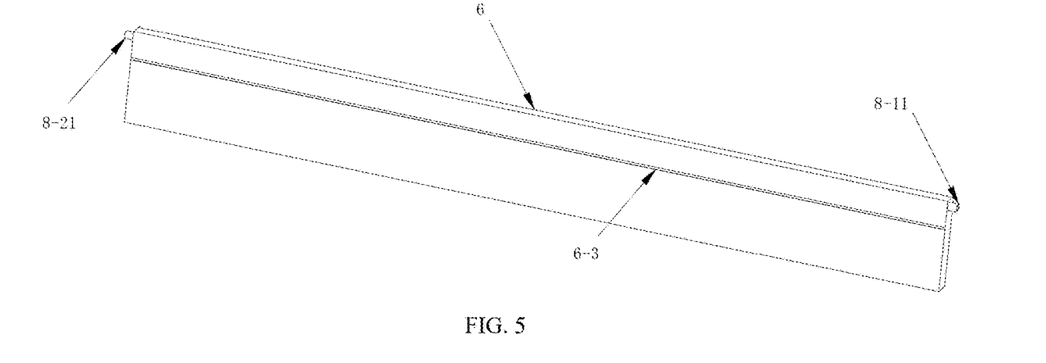
FIG. 5 is a schematic diagram of an external structure of the flow channel plate in FIG. 4.

As shown in FIG. 4 and FIG. 5, a first liquid inlet sub-port 8-11 and a first liquid outlet sub-port 8-21 are formed in the top of the flow channel plate 6, the first liquid inlet sub-port 8-11 may communicate with the liquid inlet port 1-1 through a liquid inlet pipeline, for example, the first liquid inlet sub-ports 8-11 of the flow channel plates 6 at the both sides are connected to a pipeline, and then connected to the liquid inlet port 1-1 through a tee; the first liquid outlet sub-ports 8-21 may communicate with the liquid outlet port 1-2 through a liquid outlet pipeline, which will not be elaborated herein; and as shown in FIG. 6, a heat exchange medium enters into the flow channel plates 6 from the tops, passes through the first flow channel grooves 6-1, and then leaves from the tops, in this way, the plurality of first flow channel grooves 6-1 are filled with the heat exchange medium as much as possible, so that a heat exchange effect is guaranteed; and through arranging the turbulent-flow blocks 6-2 at the first flow channel grooves 6-1, a flow rate of the heat transfer medium may be adjusted, so that a fluid is more uniform while entering the different first flow channel grooves 6-1.

In some examples, in the plurality of first flow channel grooves 6-1, a cross-section dimension of the turbulent-flow block 6-2 in the first flow channel groove 6-1 located in the top is a first dimension, a cross-section dimension of the turbulent-flow block 6-2 in the first flow channel groove 6-1 located in the bottom is a second dimension, a cross-section dimension of the turbulent-flow block 6-2 in the first flow channel groove 6-1 located at the middle part is a third dimension, and the first dimension is greater than the second dimension and greater than the third dimension.

As shown in FIG. 4, four turbulent-flow blocks 6-2 are arranged from top to bottom, a cross section of the turbulent-flow block 6-2 is circular, then a cross-section dimension is a diameter of a circle, a first dimension of the turbulent-flow block 6-2 located at the top is 22 mm, a second dimension of the turbulent-flow block 6-2 located at the bottom is 18 mm, and a third dimension of the two the turbulent-flow blocks 6-2 located at the middle part is 14 mm, the first dimension is set to be greater than the second dimension and greater than the third dimension, so that a flow speed of the heat exchange medium may be the same above and below the flow channel plates 6, too rapid transversal flow at the top is avoided, and the heat exchange medium is also prevented from being concentrated at the bottom due to the action of gravity to form a circulating dead area at the bottom.

Figure 7:
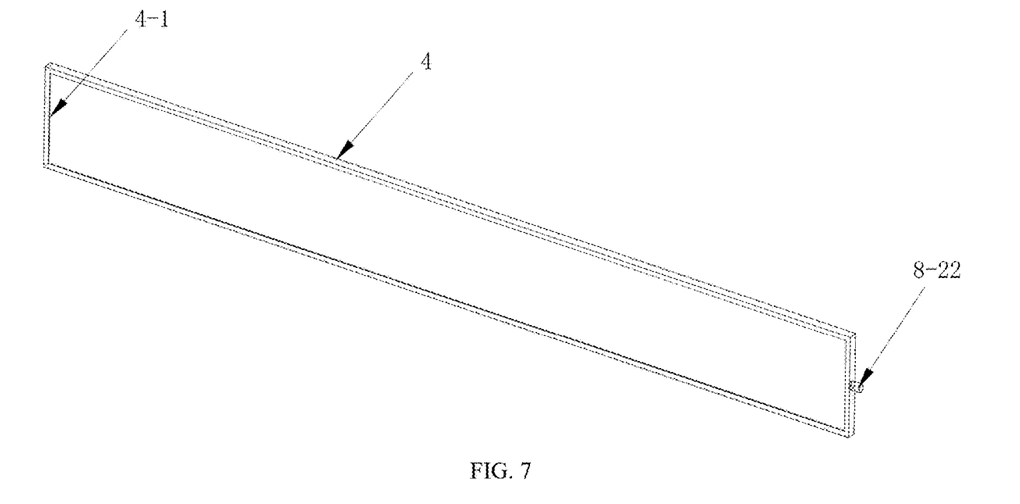
FIG. 7 is a schematic structure diagram of a top plate in the example of the present application.

In some examples, as shown in FIG. 7, a second flow channel groove 4-1 facing the lengthwise direction is formed in one side close to the battery cells 3-1, of the top plate 4, and one end of the second flow channel groove 4-1 communicates with the liquid outlet port 1-2.

As shown in FIG. 7, the top plate 4 is provided with a second flow channel groove 4-1, and one end of the second flow channel groove 4-1 is provided with a second liquid outlet sub-port 8-22, so that the heat exchange medium entering into the sealed space 8 is facilitated to flow towards the second liquid outlet sub-port 8-22 along the second flow channel groove 4-1 while reaching the top, a sufficient space is reserved to guarantee smooth flow, etc., and a depth of the second flow channel groove 4-1 is, for example, 10 mm to 15 mm, and an overall thickness of the top plate 4 is, for example, 10 mm to 20 mm, which are not specifically limited.

In some examples, as shown in FIG. 8, the heat exchange structure 7 includes a heat exchange flow channel 7-1 and a cover plate 7-8; the heat exchange flow channel 7-1 is formed at the bottom of the box body 1, and one end of the heat exchange flow channel 7-1 communicates with the liquid inlet port 1-1; and the cover plate 7-8 covers above the heat exchange flow channel 7-1, a plurality of surge ports 7-2 are formed at the top of the cover plate 7-8, the surge port 7-2 is formed in a manner of being corresponding to a gap between the two adjacent battery cells 3-1, and the end plates 5 and the flow channel plates 6 are both abutted against the cover plate 7-8.

Figure 9:
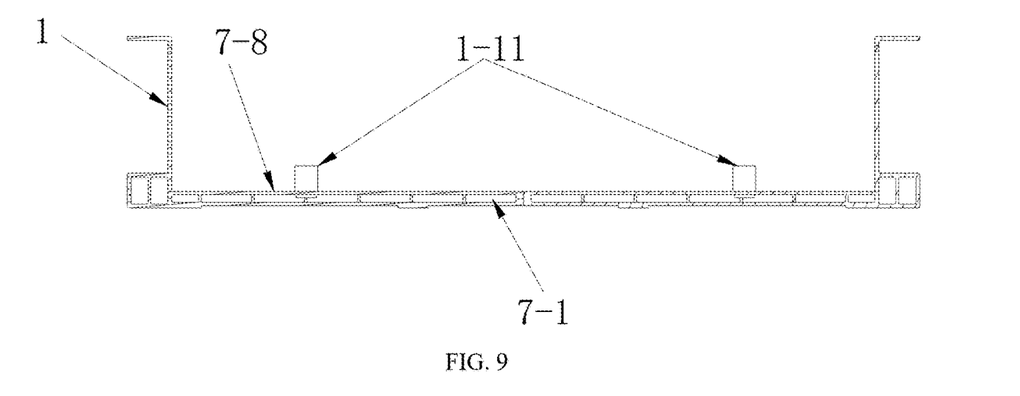
FIG. 9 is a schematic diagram of a section structure of the heat exchange structure in FIG. 8.

As shown in FIG. 9, a heat exchange flow channel 7-1 is formed at the bottom of the box body 1, a cover plate 7-8 is arranged at the top of the heat exchange flow channel 7-1, in the example, other structures are not arranged at the bottoms of the battery cells 3-1 of the battery modules 3, but the cover plate 7-8 is in direct contact with the bottom, the end plates 5 and the flow channel plates 6 are abutted against with the cover plate 7-8 and fixed to the cover plate 7-8, and the end plates 5, the flow channel plates 6, the cover plate 7-8, and the top plate 4 form a sealed space 8 together; as shown in FIG. 8, a first liquid inlet port 1-11 is formed in the bottom of the box body 1, and communicates with the heat exchange flow channel 7-1, and a second liquid inlet port 1-12 is formed in a sidewall of the box body 1, and communicates with the first liquid inlet sub-port 8-11; a plurality of surge ports 7-2 are further formed at the top of the cover plate 7-8, the heat exchange medium enters into the heat exchange flow channel 7-1 through the first liquid inlet port 1-11, and enters into the sealed space 8 via the surge ports 7-2, so that heat exchange for the battery modules 3 is realized; the surge port 7-2 is formed in a manner of being corresponding to a gap between the two adjacent battery cells 3-1, so that flow of the heat exchange medium is facilitated; the cover plate 7-8 is in direct contact with the bottoms of the battery cells 3-1, so that wall-type heat exchange between the heat exchange medium and the bottoms of the battery cells 3-1 is realized; and the heat exchange structure 7 is simple in structure, and convenient to produce, and the heat exchange medium will not flow into areas between the battery modules 3 and the box body 1.

Figure 12:
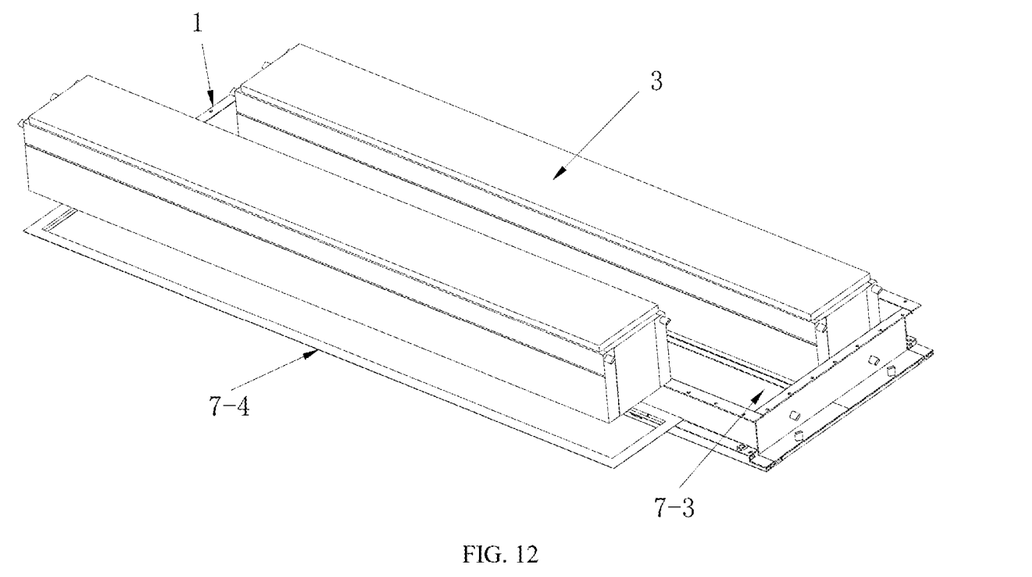
FIG. 12 is a schematic structure diagram of a second heat exchange structure in the example of the present application.

In some examples, as shown in FIG. 12, the heat exchange structure 7 includes a third flow channel groove 7-3 and a flange support 7-4 which are cooperated, the third flow channel groove 7-3 is formed in one side close to the battery modules 3, of the bottom of the box body 1, and one end of the third flow channel groove 7-3 communicates with the liquid inlet port 1-1; and the flange support 7-4 is arranged on outer peripheries of the bottoms of the battery modules 3, and includes a planar structure 7-41 and a boss structure 7-42 which are connected, the flow channel plates 6 and the end plates 5 are both abutted against the planar structure 7-41, the battery cells 3-1 are abutted against the boss structure 7-42, through holes 7-43 are formed in side walls of the boss structure 7-42, and the through hole 7-43 is formed in a manner of being corresponding to the gap between the two adjacent battery cells 3-1.

Figure 11:
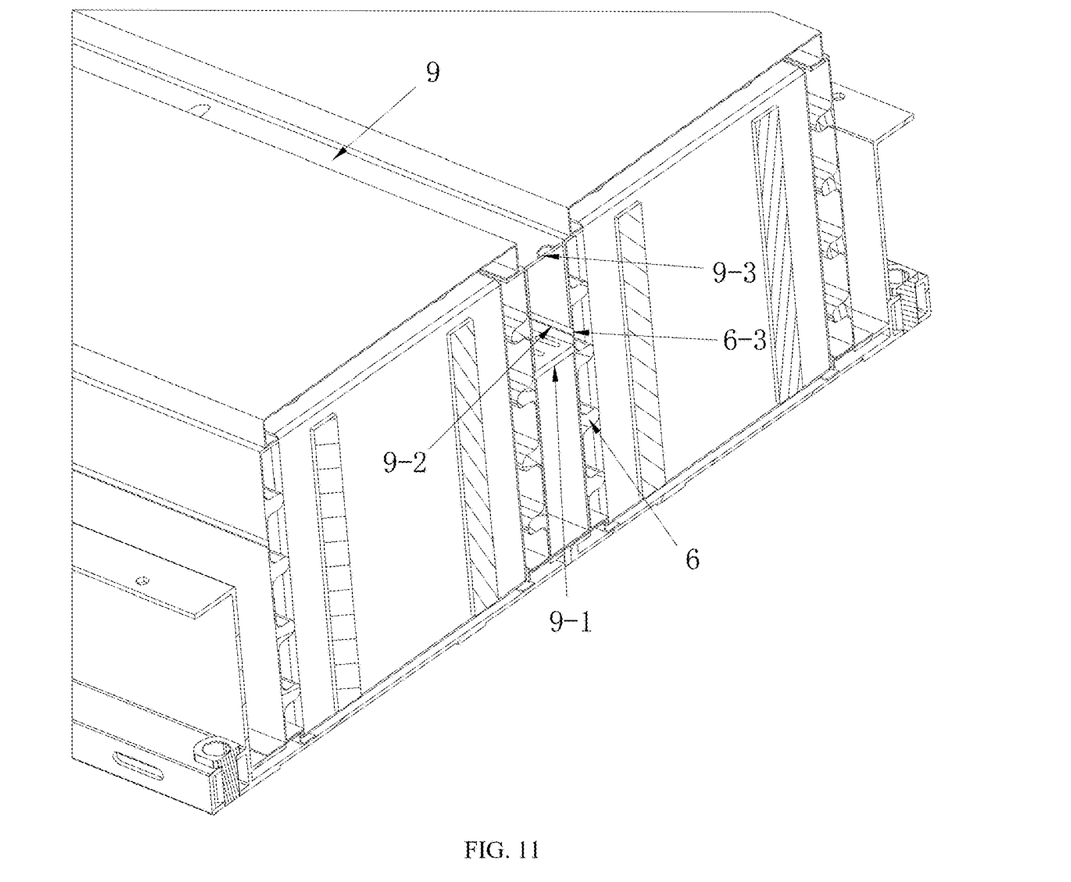
FIG. 11 is a schematic diagram of a section structure of cooperation between the explosion-proof beam in FIG. 10 and the flow channel plate.

As shown in FIG. 12, a third flow channel groove 7-3 is formed in the bottom of the inner side of the box body 1, a flange support 7-4 is arranged on outer peripheries of the bottoms of the battery modules 3, the flange support 7-4 and the third flow channel groove 7-3 are cooperated to form a heat exchange structure 7, as shown in FIG. 11, and due to the manner, cooperation between the battery modules 3 and the box body 1 is more convenient, and moreover, a height space is saved.

One end of the third flow channel groove 7-3 communicates with the liquid inlet port 1-1, and the heat exchange medium enters into the third flow channel groove 7-3 through the liquid inlet port 1-1 and flows along the third flow channel groove 7-3; and as shown in FIG. 12, the third flow channel groove 7-3 may be of an eave-type structure, and provides a space for the flow of the heat exchange medium.

Figure 13:
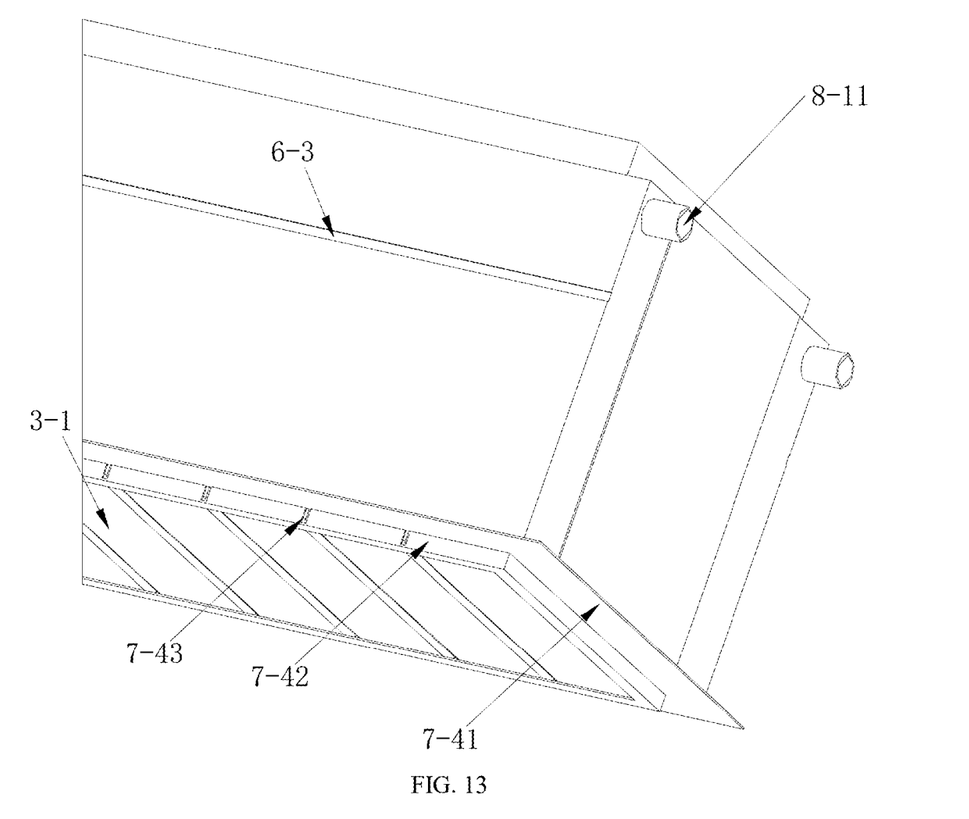
FIG. 13 is a schematic diagram of a local structure of a second battery module in the example of the present application.
Figure 14:
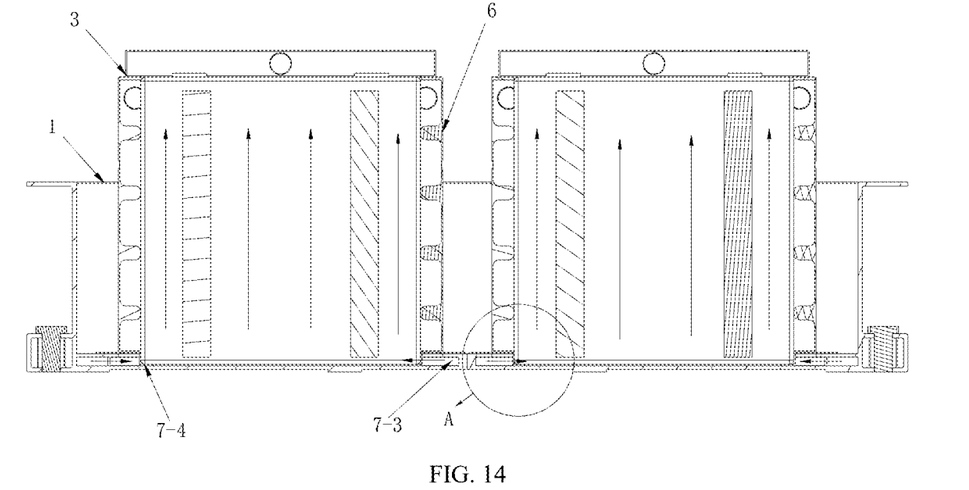
FIG. 14 is a schematic diagram of a cross-section structure of a second battery pack in the example of the present application.
Figure 15:
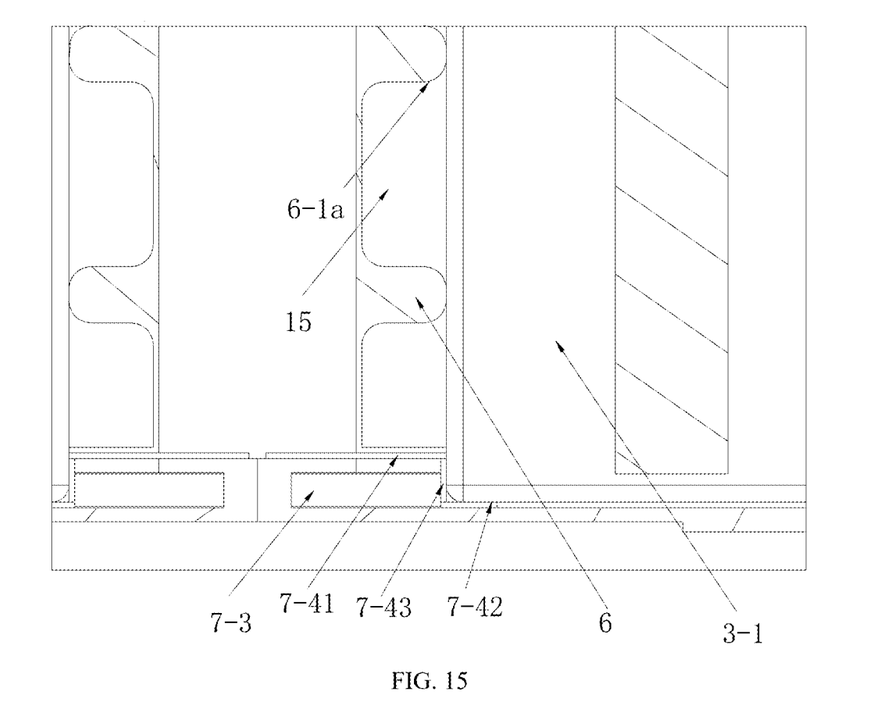
FIG. 15 is a schematic diagram of an enlarged structure of a part A in FIG. 14.

As shown in FIG. 13, the flange support 7-4 includes a planar structure 7-41 and a boss structure 7-42 which are connected, through holes 7-43 are formed in side walls of the boss structure 7-42, and the through hole 7-43 is formed in a manner of being corresponding to the gap between the two adjacent battery cells 3-1, as shown in FIG. 15, the flow channel plates 6 and the end plates 5 are both abutted against the planar structure 7-41, and the planar structure 7-41 is used for being cooperated with a groove opening of the third flow channel groove 7-3, and supporting the end plates 5 and the flow channel plates 6; and the battery cells 3-1 are abutted against the boss structure 7-42, the boss structure 7-42 is cooperated with the bottom of the third flow channel groove 7-3, and supports the battery cells 3-1, certain voids are formed between the battery cells 3-1 and the bottom of the third flow channel groove 7-3, as shown in FIG. 14, in this way, after entering into the third flow channel groove 7-3, the heat exchange medium enters into the voids through the through holes 7-43 to flow, and is in direct contact with the bottoms of the battery cells 3-1 for heat exchange, and through forming the through hole 7-43 in a manner of being corresponding to the gap of the battery cells 3-1, the heat exchange medium is facilitated to flow upwards along the gaps of the battery cells 3-1.

Due to the heat exchange structure, the bottom flow channel occupies a less space in the height direction, and a high space utilization rate in the box body 1 is achieved, so that a use amount of the heat exchange medium may be reduced, and a cost may be saved; and the bottom of flange support 7-4 is in a rectangular-ambulatory-plane shape, so that a space is provided for the heat exchange medium to flow from front to back, and the heat exchange medium is in direct contact with the bottoms of battery cells 3-1, so that high heat exchange efficiency is achieved.

Figure 16:
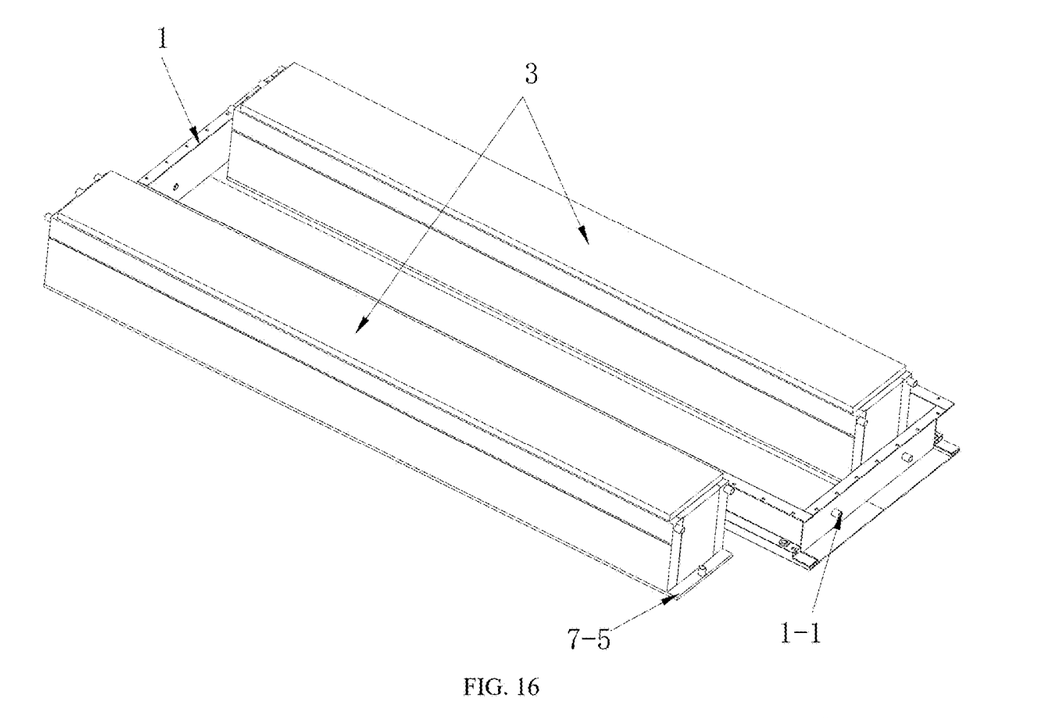
FIG. 16 is a schematic structure diagram of a third heat exchange structure in the example of the present application.

In some examples, as shown in FIG. 16, the heat exchange structure 7 includes a bottom plate 7-5, the bottom plate 7-5 is arranged at the bottoms of the battery modules 3, a fourth flow channel groove 7-6 is formed in one side close to the battery modules 3, of the bottom plate 7-5, and one end of the fourth flow channel groove 7-6 communicates with the liquid inlet port 1-1; and the end plates 5 and the flow channel plates 6 are both abutted against the bottom plate 7-5, protrusions 7-7 are arranged at the bottoms of two opposite sides in the widthwise direction, of the fourth flow channel groove 7-6, and the battery cells 3-1 are abutted against the tops of the protrusions 7-7.

Figure 17:
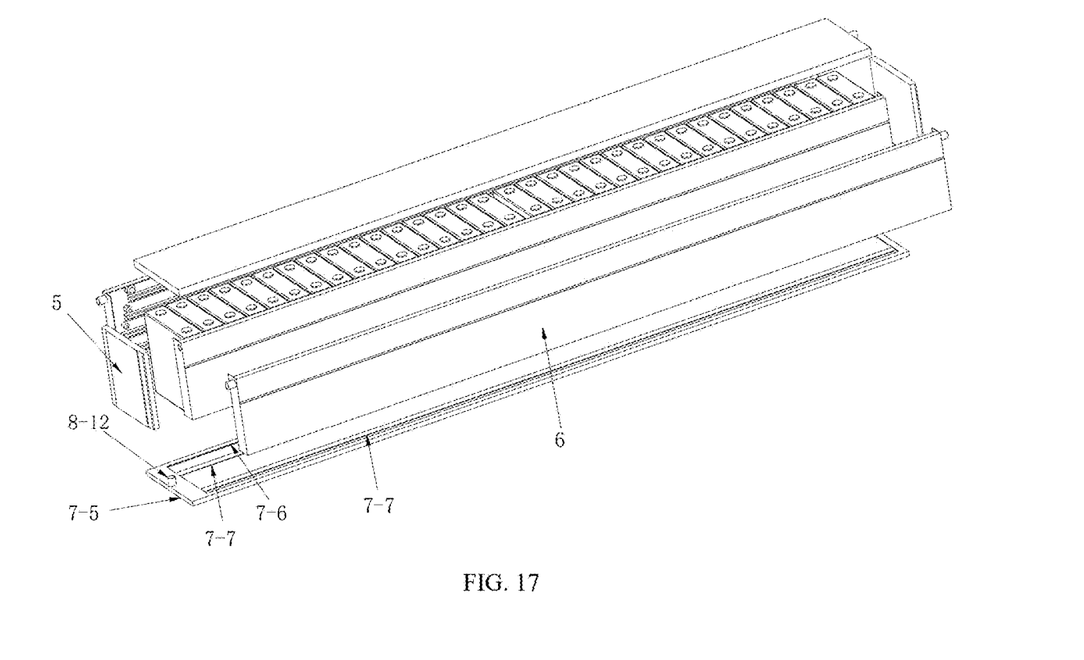
FIG. 17 is a schematic diagram of an explosive structure of a third battery module in the example of the present application.

As shown in FIG. 16, the bottom plate 7-5 is directly arranged at the bottoms of the battery modules 3, and is a heat exchange structure 7; as shown in FIG. 17, a fourth flow channel groove 7-6 is formed in one side close to the battery modules 3, of the bottom plate 7-5, one end of the fourth flow channel groove 7-6 is provided with a second liquid inlet sub-port 8-12, the second liquid inlet sub-port 8-12 may communicate with the liquid inlet port 1-1 through a liquid inlet pipeline, and after entering into the fourth flow channel groove 7-6, the heat exchange medium flows along the fourth flow channel groove 7-6, and is in direct contact with the battery cells 3-1 for heat exchange; and the end plates 5 and the flow channel plates 6 are both abutted against the bottom plate 7-5, protrusions 7-7 are arranged at the bottoms of two opposite sides in the widthwise direction, of the fourth flow channel groove 7-6, the battery cells 3-1 are abutted against the tops of the protrusions 7-7, and the two protrusions 7-7 support the battery cells 3-1.

The heat exchange structure is integrated on the battery modules 3, and the liquid inlet port 1-1, the bottom flow channel, the surge ports 7-2, etc. do not need to be separately formed in the bottom of the box body 1, so that convenient production and low cost investment are achieved, and the heat exchange for the bottoms of the battery cells 3-1 no longer depends on the box body 1, and the heat exchange structure may be adapted to the box bodies 1 with many specifications and dimensions.

Figure 10:
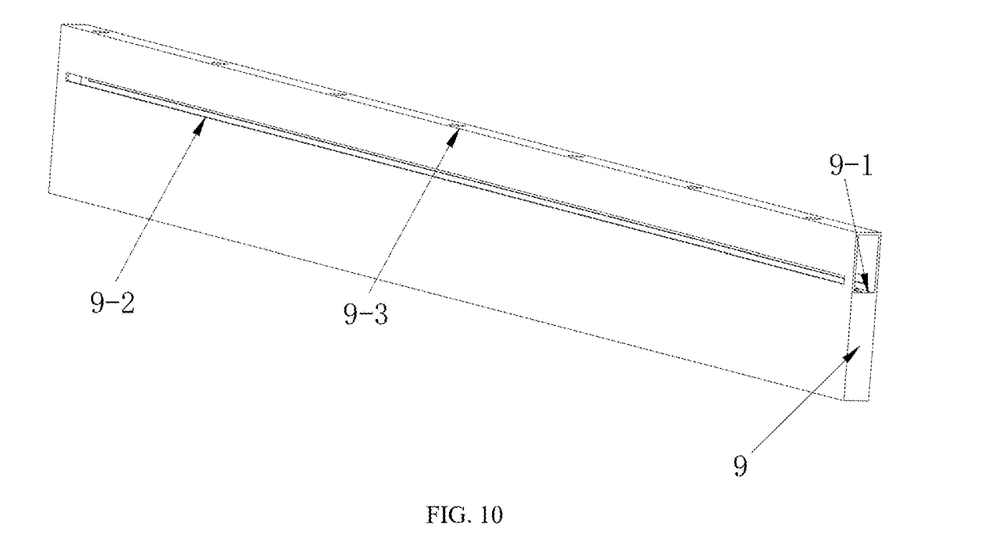
FIG. 10 is a schematic structure diagram of an explosion-proof beam in the example of the present application.

In some examples, as shown in FIG. 10, an explosion-proof beam 9 is arranged between the two adjacent battery modules 3, the explosion-proof beam 9 is of a hollow structure, and provided with a partition plate 9-1 inside, and the partition plate 9-1 is of a perforated structure; explosion-proof holes 9-2 are formed in side walls of the explosion-proof beam 9, the explosion-proof holes 9-2 are located above the partition plate 9-1, weak areas 6-3 are formed on side walls of the flow channel plates 6, the weak areas 6-3 are coated with the explosion-proof holes 9-2, and the explosion-proof holes 9-2 are abutted against the flow channel plates 6; and exhaust holes 9-3 are formed in the top of the explosion-proof beam 9, and an explosion-proof valve 2-1 is arranged on the top cover 2.

As shown in FIG. 1, an explosion-proof beam 9 is arranged between the two adjacent battery modules 3, so as to avoid heat runaway of the battery pack.

As shown in FIG. 10, the explosion-proof beam 9 is of a hollow structure, and provided with a partition plate 9-1 inside, the partition plate 9-1 is of a perforated structure, a reserved chamber for the heat exchange medium is formed below the partition plate 9-1, and a reserved chamber for gas is formed above the partition plate 9-1; explosion-proof holes 9-2 are formed in side walls of the explosion-proof beam, the explosion-proof holes 9-2 are located above the partition plate 9-1, as shown in FIG. 5, weak areas 6-3 are formed on side walls of the flow channel plates 6, as shown in FIG. 11, the weak areas 6-3 are covered with the explosion-proof holes 9-2, and the explosion-proof holes 9-2 are abutted against the flow channel plates 6, in this way, in the case of heat runaway of the battery cells 3-1, the weak areas 6-3 explode, the gas and the heat exchange medium are mixed and surged out, and enter into the interior of the explosion-proof beam 9 via the explosion-proof holes 9-2, and the heat exchange medium flows below the partition plate 9-1, while the gas remains above the partition plate 9-1; as shown in FIG. 10, exhaust holes 9-3 are formed in the top and end parts of the explosion-proof beam 9, the exhaust holes 9-3 in the top play an auxiliary role to prevent the gas from not being able to be exhausted from the exhaust holes 9-3 in the end parts in time to cause an excessive pressure; and as shown in FIG. 1, an explosion-proof valve 2-1 is arranged on the top cover 2, and arranged in a manner of being corresponding to the exhaust holes 9-3 in the end parts of the explosion-proof beam 9, in this way, the gas above the partition plate 9-1 may rapidly enter into the box body 1 and be exhausted via the explosion-proof valve 2-1.

The explosion-proof beams 9 realize effects of high-rate charging and discharging, as well as no ignition or diffusion in heat runaway, realize gas-liquid separation in the case of heat runaway, and prevents the high-temperature gas from igniting the heat exchange medium.

Figure 18:
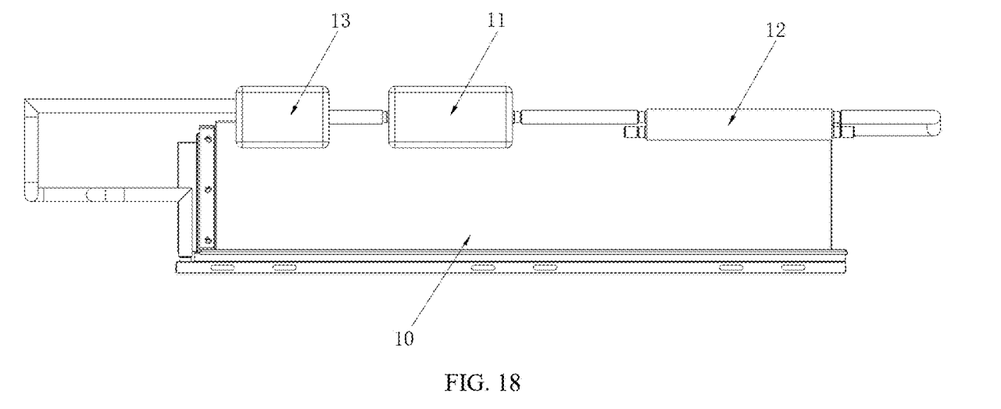
FIG. 18 is a schematic diagram of an explosive structure of a heat exchange system for the battery pack in the example of the present application.

In some examples of the present application, a heat exchange system for the battery pack is provided, and as shown in FIG. 18, includes a heat exchanger 12, an expansion pot 11, a drive pump 13, and the battery pack 10 described in any one of the examples above, which form a series circuit.

The heat exchange system for the battery pack may be applied to the vehicle-mounted field, and the heat exchanger 12 may communicate with an external liquid-cooling unit to heat or cool the heat exchange medium in the battery pack 10; the expansion pot 11 may store and replenish the heat exchange medium, and may balance a pressure of the heat exchange system for the battery pack; and the drive pump 13 may realize circulation of the heat exchange medium.

Figure 19:
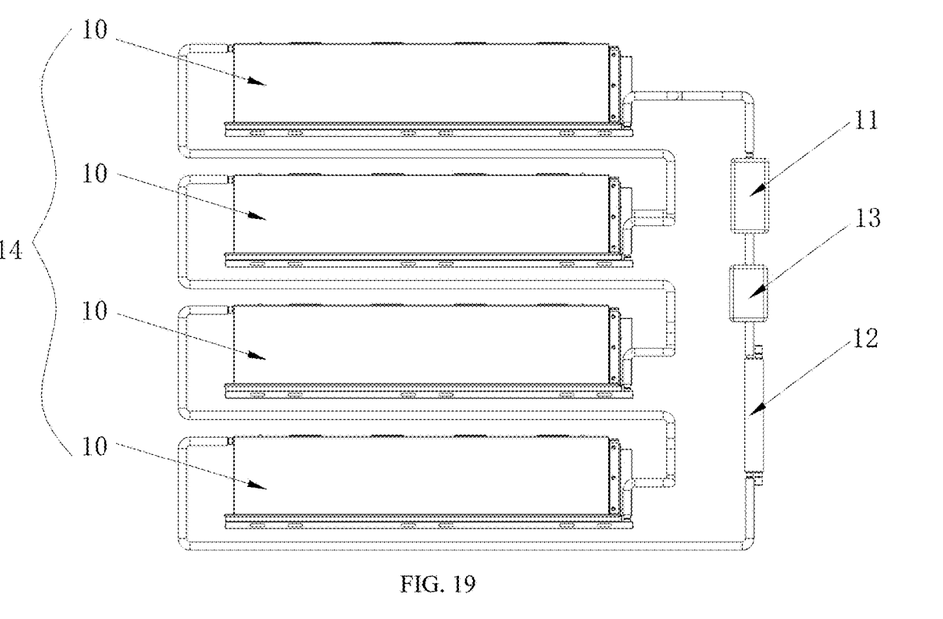
FIG. 19 is a schematic diagram of an explosive structure of a heat exchange system for a battery cluster in the example of the present application.

In some examples of the present application, a heat exchange system for a battery cluster is provided, and as shown in FIG. 19, includes a heat exchanger 12, an expansion pot 11, a drive pump 13, and the battery cluster 14 which form a series circuit, where the battery cluster 14 includes a plurality of the battery packs 10 described in any one of the examples above and connected in series.

The heat exchange system for the battery cluster may be applied to the field of energy storage, a plurality of the battery packs 10 are connected in series to form the battery cluster 14, the battery cluster 14 is connected with the heat exchanger 12, the expansion pot 11, and the drive pump 13 to form the heat exchange system for the battery cluster 14; and on this basis, a plurality of the battery clusters 14 may also be connected in parallel to form a container heat exchange system, and apparatuses with different specifications may be selected according to different flow rate demands.

Those of ordinary skill in the art should understand that: the discussion for any example above is merely exemplary and is not intended to imply that the scope of the present application (including the claims) is limited to these instances; and under the concept of the present application, the technical features in the example above or in different examples may also be combined, the steps may be realized in any order, and there are many other variations in different aspects of the example above of the present application, which are not provided in detail for the sake of simplicity.

In addition, in the case of elaborating on the details to describe the exemplary example of the present application, it is apparent to those skilled in the art that, the example of the present application may be implemented without these details or with variations in these details. Therefore, these descriptions should be considered to be illustrative rather than restrictive.

In order to simplify the explanation and discussion, and to avoid making the example of the present application difficult to understand, well-known power/ground connections with other components may or may not be shown in the provided drawings. In addition, the apparatuses may be shown in the form of a block diagram to avoid making the example of the present application difficult to understand, and this also takes into account the fact that the details about the implementation manners for these block-diagram apparatuses are highly dependent on a platform on which the example of the present application will be implemented (i.e., these details should be completely within the understanding scope of those skilled in the art). In the case of elaborating on the specific details to describe the exemplary example of the present application, it is apparent to those skilled in the art that, the example of the present application may be implemented without these specific details or with variations in these specific details. Therefore, these descriptions should be considered to be illustrative rather than restrictive.

Although the present application has been described in combination with the specific examples of the present application, many substitutions, modifications, and variations of these examples will be apparent to those of ordinary skill in the art according to the descriptions above. The examples of the present application are intended to cover all such substitutions, modifications, and variations falling within the broad scope of the appended claims. Therefore, any omission, modification, equivalent substitution, improvement, etc. made within the spirit and principles of the examples of the present application should be included in the protection scope of the present application.

What is claimed is:

1. A battery pack, comprising:
   a box body which is provided with a liquid inlet port and a liquid outlet port;
   a top cover which is located at a top of the box body; and
   a plurality of battery modules which are located in the box body,
   wherein the battery module comprises a plurality of stacked battery cells, a top plate is arranged at tops of the plurality of battery cells, end plates are arranged at two opposite sides in a lengthwise direction, flow channel plates are arranged at two opposite sides in a widthwise direction, a heat exchange structure is arranged below, and the plurality of battery cells are coated with the top plate, the end plates, the flow channel plates and the heat exchange structure to form a sealed space, so as to accommodate a heat exchange medium;
   a plurality of first flow channel grooves facing the lengthwise direction are formed in one side close to the battery cells, of the flow channel plate, one end of the first flow channel groove communicates with the liquid inlet port, the other end of the first flow channel groove communicates with the liquid outlet port, and groove openings of the first flow channel grooves are abutted against side walls of the battery cells to form flow channels;
   the heat exchange structure communicates with the liquid inlet port, a bottom of the sealed space communicates with the heat exchange structure, and a top of the sealed space communicates with the liquid outlet port; and
   a top of one side of the flow channel plate communicates with the liquid inlet port, a top of the other side of the flow channel plate communicates with the liquid outlet port; turbulent-flow blocks are arranged on the flow channel plates, located at end parts of the first flow channel grooves, and arranged in close proximity to the liquid inlet port; and in the plurality of first flow channel grooves, a cross-section dimension of the turbulent-flow block in the first flow channel groove located at a top is a first dimension, a cross-section dimension of the turbulent-flow block in the first flow channel groove located at a bottom is a second dimension, a cross-section dimension of the turbulent-flow block in the first flow channel groove located at a middle part is a third dimension, and the first dimension is greater than the second dimension and greater than the third dimension.

2. The battery pack according to claim 1, wherein a second flow channel groove facing the lengthwise direction is formed in one side close to the battery cells, of the top plate, and one end of the second flow channel groove communicates with the liquid outlet port.

3. The battery pack according to claim 1, wherein the heat exchange structure comprises a heat exchange flow channel and a cover plate, the heat exchange flow channel is formed at a bottom of the box body, and one end of the heat exchange flow channel communicates with the liquid inlet port; and the cover plate covers above the heat exchange flow channel, a plurality of surge ports are formed at a top of the cover plate, the surge port is formed in a manner of being corresponding to a gap between the two adjacent battery cells, and the end plates and the flow channel plates are both abutted against the cover plate.

4. The battery pack according to claim 1, wherein the heat exchange structure comprises a third flow channel groove and a flange support which are cooperated, the third flow channel groove is formed in one side close to the battery modules, of the bottom of the box body, and one end of the third flow channel groove communicates with the liquid inlet port; and the flange support is arranged on outer peripheries of bottoms of the battery modules, and comprises a planar structure and a boss structure which are connected, the flow channel plates and the end plates are both abutted against the planar structure, the battery cells are abutted against the boss structure, through holes are formed in side walls of the boss structure and the through hole is formed in a manner of being corresponding to the gap between the two adjacent battery cells.

5. The battery pack according to claim 1, wherein the heat exchange structure comprises a bottom plate, the bottom plate is arranged at bottoms of the battery modules, a fourth flow channel groove is formed in one side close to the battery modules, of the bottom plate, and one end of the fourth flow channel groove communicates with the liquid inlet port; and the end plates and the flow channel plates are both abutted against the bottom plate, protrusions are arranged at bottoms of two opposite sides in the widthwise direction, of the fourth flow channel groove, and the battery cells are abutted against tops of the protrusions.

6. The battery pack according to claim 1, wherein an explosion-proof beam is arranged between two adjacent battery modules, the explosion-proof beam is of a hollow structure, and provided with a partition plate inside, and the partition plate is of a perforated structure; explosion-proof holes are formed in side walls of the explosion-proof beam, the explosion-proof holes are located above the partition plate, weak areas are formed on side walls of the flow channel plates, the weak areas are coated with the explosion-proof holes, and the explosion-proof holes are abutted against the flow channel plates; and exhaust holes are formed in a top or end parts of the explosion-proof beam, and an explosion-proof valve is arranged on the top cover.

7. A heat exchange system for a battery pack, comprising a heat exchanger, an expansion pot, a drive pump, and the battery pack according to claim 1, which form a series circuit.

8. A heat exchange system for a battery cluster, comprising a heat exchanger, an expansion pot, a drive pump, and a battery cluster which form a series circuit, wherein the battery cluster comprises a plurality of the battery packs according to claim 1 which are connected in series.

* * * * *